United States Patent [19]
Dey

[11] Patent Number: 5,117,305
[45] Date of Patent: * May 26, 1992

[54] MODIFIED RETROREFLECTOR

[75] Inventor: Thomas W. Dey, Springwater, N.Y.

[73] Assignee: Eastman Kodak Company, Rochester, N.Y.

[*] Notice: The portion of the term of this patent subsequent to Jan. 28, 2009 has been disclaimed.

[21] Appl. No.: 557,891

[22] Filed: Jul. 25, 1990

[51] Int. Cl.⁵ .................................... G02B 5/122
[52] U.S. Cl. ...................... 359/529; 359/530
[58] Field of Search ............... 359/529, 530, 542, 546, 359/584, 629, 639

[56] References Cited

U.S. PATENT DOCUMENTS 1,840,790  1/1932  Oestnaes et al. .................. 359/529
3,865,467  2/1975  Von Thuna ....................... 359/529
4,097,141  6/1978  Warner ............................. 359/529
4,131,791  12/1978  Lego, Jr. ........................... 359/529
4,761,055  8/1988  Hatje ................................ 359/529

Primary Examiner—Loha Ben
Attorney, Agent, or Firm—Stephen C. Kaufman

[57] ABSTRACT

A novel optical device, comprising, in one embodiment, a modified corner cube retroreflector. A conventional corner cube retroreflector may be modified so that a face plate comprises an enhanced reflectivity coating. The novel device functions such that at least five percent of the energy of a radiation beam incident to the device, may be reflected at the face plate in accordance with Snell's Law. It is disclosed that the novel device may be advantageously employed in a novel optical alignment assembly.

8 Claims, 5 Drawing Sheets

MODIFIED RETROREFLECTOR

CROSS-REFERENCE TO A RELATED APPLICATION

This application is related to U.S. patent application Ser. No. 07/558,032 filed Jul. 25, 1990 by Dey, which Application is being filed contemporaneously with this application. The entire disclosure of this Application is incorporated by reference herein. Each of these applications is copending and commonly assigned.

FIELD OF THE INVENTION

This invention relates to retroreflectors.

INTRODUCTION TO THE INVENTION

Retroreflectors are well known optical devices. Retroreflectors may comprise a prism structure, for example, and they can function in such a manner that the retroreflector can return a radiation beam entering a prism base, back onto itself after three internal reflections, over a wide range of prism orientations.

Optical systems can exploit this functional capability of retroreflectors in applications where a desired optical orientation may be difficult or impossible to control without the use of a retroreflector, and where a mirror may be an unsatisfactory substitute.

SUMMARY OF THE INVENTION

Retroreflectors may be constructed as a solid corner cube retroreflector, as a hollow mirrored corner cube retroreflector, or as a cat's eye retroreflector.

First, a "solid corner cube" retroreflector may be constructed from a solid cubical glass. The corner cube retroreflector may be made by cutting off one corner of the solid cubical glass, so that there are three mutually perpendicular reflecting surfaces, and a clear entrance or face plate. This action creates a one piece corner cube retroreflector, which can function to return substantially all radiation beams striking it, back (parallel) toward their source.

An example of the construction of such a solid corner cube retroreflector is shown in FIG. 1. In FIG. 1, a corner cube retroreflector 10 is constructed from a glass cube 12, from which three mutually perpendicular reflecting surfaces (14, 16, 18) are cut off to fabricate the corner cube retroreflector 10. (An entrance or face plate is not shown in this view.)

A retroreflector may also be constructed by juxtaposing three conventional mirrors, with an opening to allow radiation to enter and leave the retroreflector. An example of such a hollow mirror retroreflector is shown in FIG. 2. In FIG. 2, a hollow mirror retroreflector 20 comprises a set of three mirrors 22, 24, 26 (typically coated), juxtaposed as shown, and with an opening 28 which allows radiation to enter and leave the mirror retroreflector 20. Note that the faces of the three mirrors (22, 24, 26) define the corner of a hollow cube.

A retroreflector may also be constructed in accordance with what is commonly called a "cat's eye" configuration, for example, of the type shown in FIG. 3. Here, a cat's eye retroreflector 30 comprises a mirror 32, and a lens 34 comprising an anti-reflection coating 36. The mirror 32 and the lens 34 are optically arranged along a common optical axis 38, so that radiation beams (shown by the FIG. 3 arrows) striking the retroreflector 30 are returned back (parallel) to their source.

The FIGS. 1-3 retroreflectors may be compared from the vantage point of the conventional desired functionality of the retroreflector: namely, that it return substantially all radiation beams striking it, back (parallel) toward their source. From this perspective, it is known that the advantage of the one piece FIG. 1 corner cube retroreflector 10 may be offset, due to spurious and deleterious radiation beams reflecting off the entrance or face plate. One approximate solution to this problem of spurious reflections, is to apply a suitable anti-reflective coating to the FIG. 1 entrance or face plate. This solution may be used as well in the FIG. 3 multi-element cat's eye retroreflector 30.

A second solution to the problem of spurious entrance or face plate reflections, is simply to use the FIG. 2 hollow mirror retroreflector 20. However, the advantage of the hollow mirror retroreflector, namely, that it does not have a material face plate, and therefore cannot precipitate spurious entrance or face plate reflections, may be offset by the disadvantages of coated mirrors, and a difficulty in aligning the three juxtaposed mirrors.

In summary, in accordance with the conventional desired functionality of retroreflectors, namely, that they return incident radiation back (parallel) to their source, it is thought that optimal performance may be realized by using anti-reflecting coatings, where suitable, to the end of preventing incident radiation from leaving the retroreflector from any but a path parallel to the incident path.

I have taken a completely different approach to one's conventional understanding of the capabilities and functionality of the typical retroreflector. I have now discovered that what has heretofore been deemed a "deficiency", namely the "spurious" reflections, may be, in fact, of great value, so that one desires to enhance and selectively control, rather than diminish, this phenomena. By way of this discovery, I have thereby discovered a novel optical device comprising a modified retroreflector. The modified retroreflector of the present invention can open up significant, new possibilities vis a vis its employment and exploitation in optical systems.

Accordingly, in a first aspect, the present invention comprises a novel optical device comprising:

a modified corner cube retroreflector, which modified corner cube comprises
  a) a set of three mutually perpendicular reflecting surfaces; and
  b) a face plate comprising an enhanced reflectivity coating, such that at least five percent of the energy of a radiation beam incident to the device is reflected at the face plate in accordance with Snell's Law.

In a second aspect, the present invention comprises a novel optical assembly comprising:

a modified cat's eye retroreflector comprising
  a) a mirror; and
  b) a lens positioned on a common optical axis with the mirror;
wherein at least one surface of the lens comprises an enhanced reflectivity coating, such that at least five percent of a radiation beam incident to the assembly, is reflected, so that it exits the retroreflector at an angle equal in magnitude, but opposite in sign to the incident beam, as measured from the common optical axis.

The advantages of my invention, as discussed in detail below, include the fact that it may be employed in a novel optical alignment assembly, to the end of inexpensively, yet very accurately, sensing the orientation of a remote object.

BRIEF DESCRIPTION OF THE DRAWING

The invention is illustrated in the accompanying drawing, in which.

DETAILED DESCRIPTION OF THE INVENTION

Figure 4A:
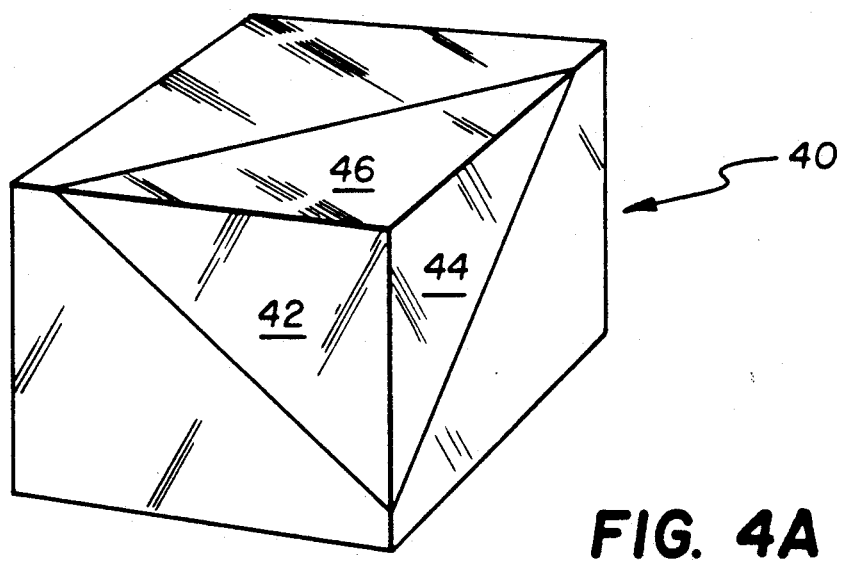
FIGS. 4A-C show the construction of a novel optical device of the present invention.
Figure 4B:
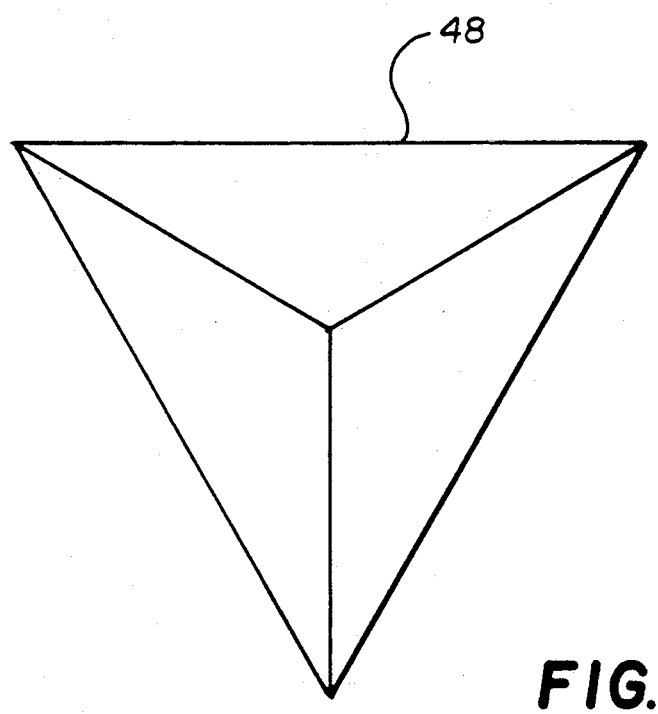
Figure 4C:
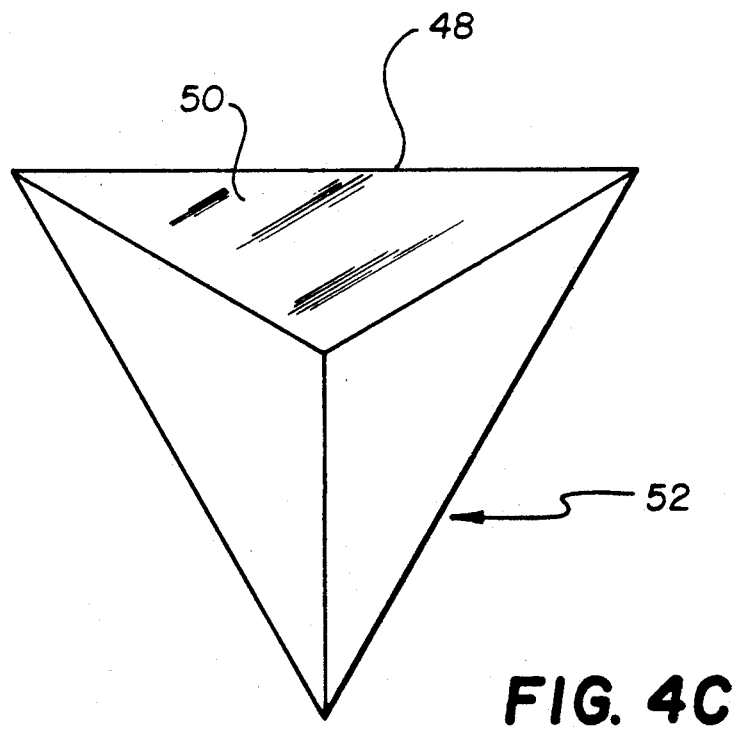

Attention is now directed to FIGS. 4A-C, which show how a novel optical device of the present invention may be constructed.

Accordingly, as shown in FIG. 4A, one may start with a glass cube 40. The glass cube 40 may comprise transparent glass, for example Schott BK-7 glass, or fused silica, or crystalline quartz. The glass cube 40 may be cut at one corner, so that three mutually perpendicular reflective surfaces (42, 44, 46) are defined, as well as a clear entrance or face plate 48. The face plate or clear entrance face 48 may be viewed from the vantage of a perspective view, FIG. 4B. The entity so far constructed, functions to reflect all the incident radiation beams back, or parallel, to their source.

FIG. 4C shows that the FIG. 4B face plate or clear entrance face 48 has now been treated by an enhanced reflectivity coating comprising a specular surface coating 50. This last action creates an optical device 52 comprising a modified corner cube retroreflector, in accordance with the first aspect of the present invention.

A suitable specular surface coating 50 preferably comprises zinc sulfide. It may alternatively comprise titanium dioxide, or aluminum or silver. The specular surface coating 50 preferably has a thickness of at least 0.05 micron, for example, 0.13 micron, or 5.0 microns. The specular surface coating 50, for the case of zinc sulfide, for example, adheres to the clear entrance face 48 by way of chemical bonding.

The required effect of the enhanced reflectivity coating comprising the specular surface coating 50 is such that at least five percent of the energy of a radiation beam incident to the optical device 52, is reflected at the face plate 48 in accordance with Snell's Law, i.e., the angle of incidence is equal to the angle of reflection.

To this end, and in particular, a desired Snell's Law percentage, say 25%, may be realized by a suitable combination of coating thickness, a selected index of refraction of the surface coating material, and/or the application of secondary coats of enhanced reflectivity compositions. For example, a secondary coating applied to a primary zinc sulfide coating, may comprise a magnesium fluoride $MgF_2$ composition, the secondary coating having a thickness from 0.05 micron to 0.5 micron. Appendix A provides a mathematical algorithm for analytically specifying a specular surface coating 50, for a selected range of desired Snell's Law percentages.

Note that for a practical employment of the optical device 52 in an alignment assembly (as specified below, for example), it is preferred to posit an upper limit to the Snell's Law percentage, for example, a Snell's Law percentage of at least 5%, but less than 95%. Thus, for this last figure, 95% of the energy of a radiation beam incident to the optical device 52, is reflected at the face plate 48 in accordance with Snell's Law, and 5% of the incident energy retroreflects parallel to the incident radiation beam.

Figure 1:
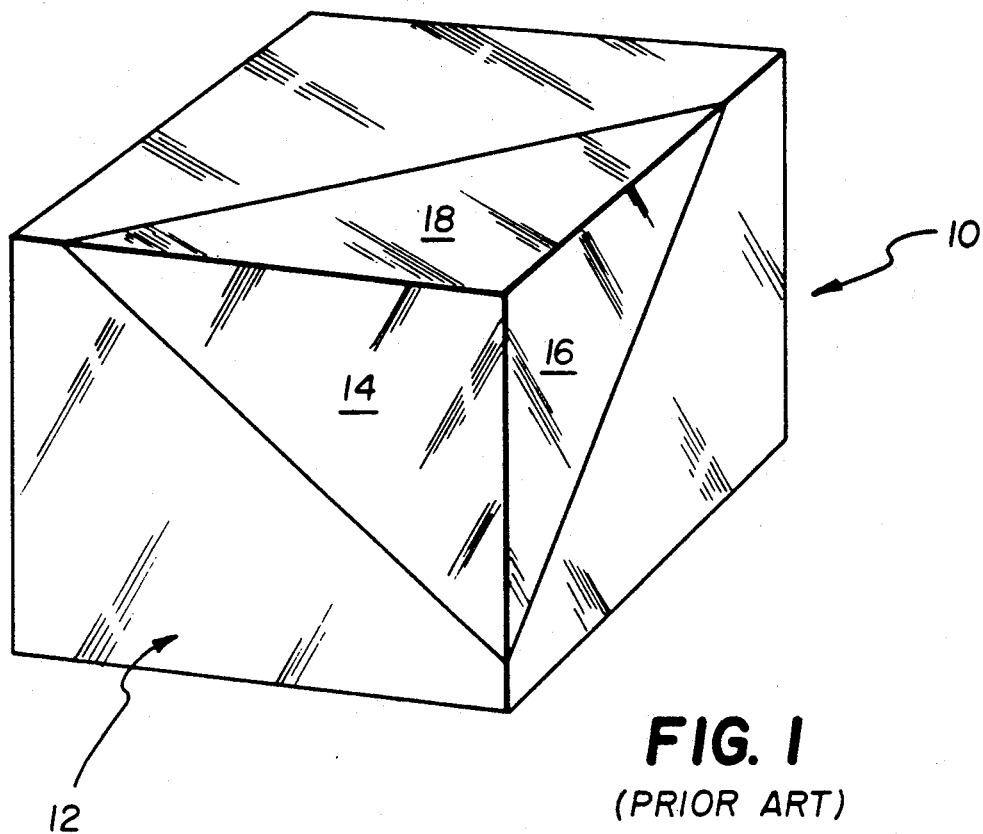
FIG. 1 shows a conventional solid corner cube retroreflector.
Figure 2:
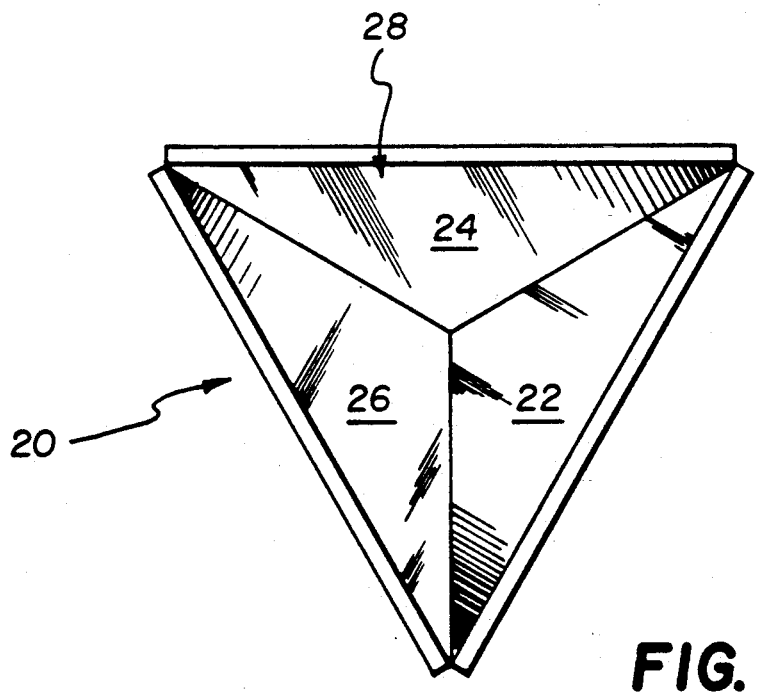
FIG. 2 shows a conventional hollow mirrored corner cube retroreflector.
Figure 3:
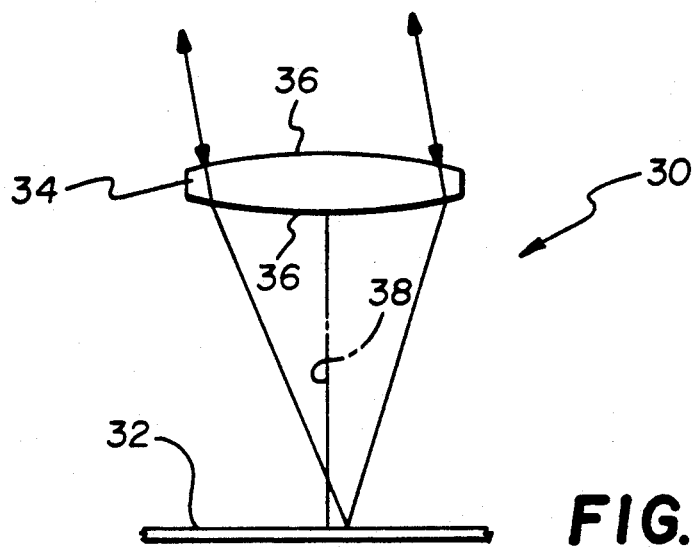
FIG. 3 shows a conventional cat's eye retroreflector.
Figure 5:
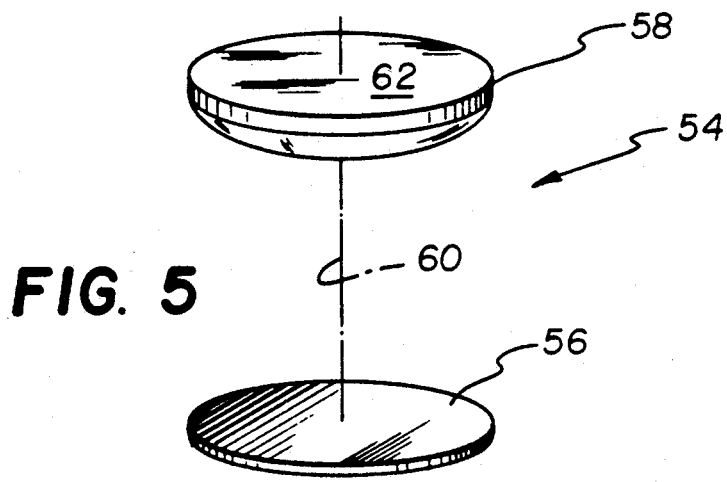
FIG. 5 shows a novel optical assembly of the present invention.

Note also that these surface coating procedures may be employed as well, to convert the FIG. 3 conventional cat's eye retroreflector, into a novel optical assembly, in accordance with the second aspect of the present invention. For example, FIG. 5 shows an optical assembly 54 comprising a modified cat's eye retroreflector. The assembly 54 comprises a mirror 56, and a lens 58 positioned on a common optical axis 60 with the mirror 56. Preferably, a flat outer or external surface 62 of the lens 58 comprises an enhanced reflectivity coating comprising aluminum, so that at least five percent of the energy of a radiation beam incident to the assembly 54, is reflected at the lens 58 in accordance with Snell's Law. Alternatively, but not shown, the assembly 54 may comprise an additional optical element, say, a second window, e.g., a lens, comprising an enhanced reflectivity coating, in lieu of specularly coating the lens 58.

Figure 6:
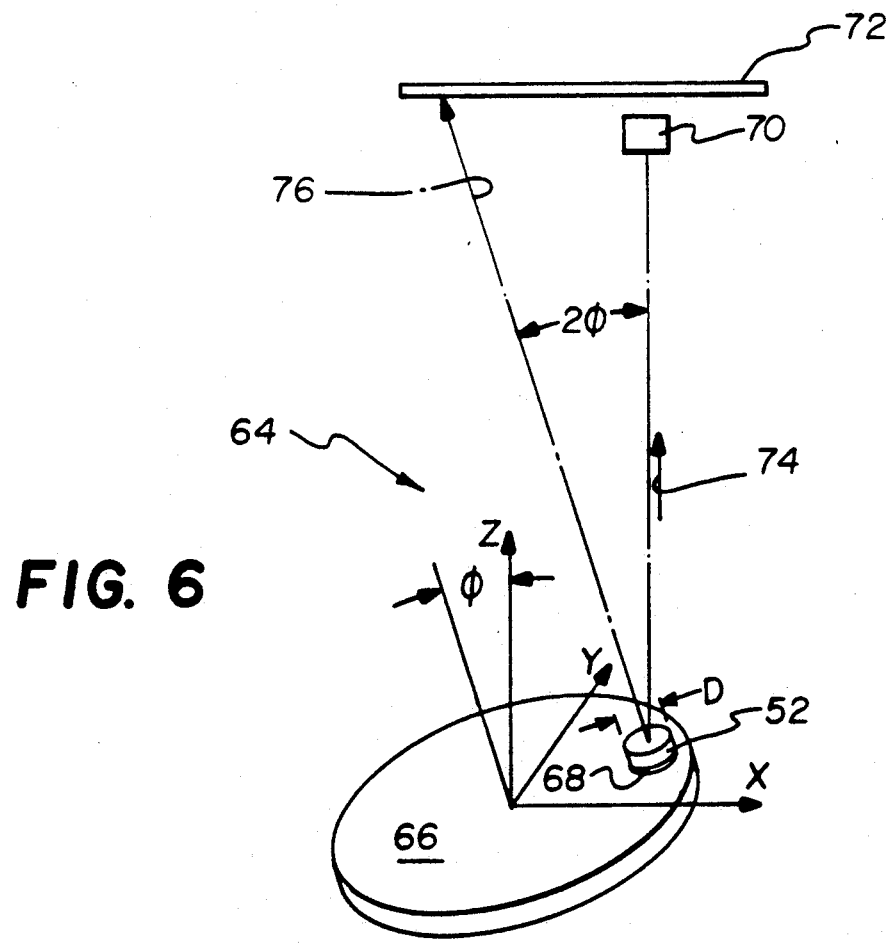
FIG. 6 shows an optical alignment assembly that employs a novel optical device of the present invention.

As indicated above, an advantage of the present invention includes the fact that it may be employed in a novel optical alignment assembly, to the end of inexpensively, yet very accurately, sensing the orientation of a remote object. FIG. 6 shows such an optical alignment assembly 64.

The FIG. 6 optical alignment assembly 64 comprises a workpiece, 66, of whose orientation $\phi$, with respect to an x,y,z coordinate system, it is desired to sense. The workpiece 66 is attached to the optical device 52 of the present invention, by conventional means 68, for example, adhesives, staples or screws. The optical device 52 subtends an aperture of diameter D. The optical alignment assembly 64 further comprises a source of radiation 70, for example, an argon-ion laser of wavelength $\lambda$, and a conventional imaging photodetector 72.

Figure 7:
FIG. 7 shows an interference pattern generated in an operation of the FIG. 6 assembly.

The operation of the FIG. 6 optical alignment assembly 64 is as follows. The source of radiation 70 directs an incident radiation beam to the optical device 52. This action generates two reflected beams, for subsequent input to the photodetector 72. A first reflected beam 74 is a retroreflective beam; a second reflected beam 76 is a "Snell's Law" beam, reflecting at an angle twice that of the workpiece tilt angle $\phi$. The retroflective beam and the Snell's Law beam generate, at the photodetector 72, an interference pattern 78 comprising discrete fringes N, as illustrated in FIG. 7. The desired orientation angle $\phi$ may be expressed by an equation (1):

$$\phi \left( \begin{array}{c} \text{magnitude} \\ \text{in radians} \end{array} \right) = \frac{N\lambda}{D2} \tag{1}$$

where,

N = a count of the FIG. 7 discrete interference fringes;

D = a known aperture diameter of the optical device 52; and
λ = a known wavelength of the source of radiation 70.

APPENDIX A

Computing the Spectral Reflectivity of a Dielectric Optical Thin-Film Stack

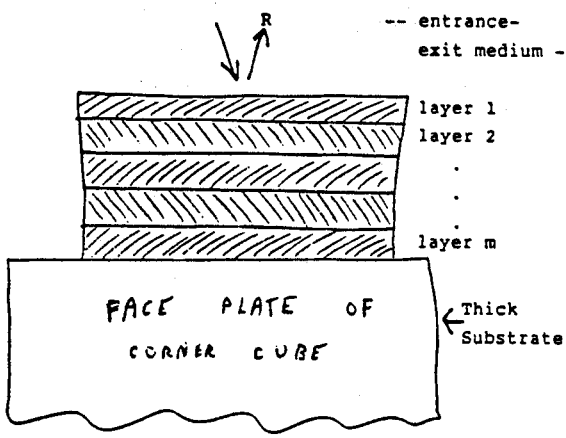

Given: $\lambda_o$
$\lambda$
$M$
$N_o$
$N_s$
$\left.\begin{array}{c} N_j \\ Q_j \end{array}\right\}$ $j = 1, 2, \ldots, M$ To Find: $R(\lambda)$ where
$\lambda_o$ = design wavelength
$\lambda$ = wavelength at which reflectivity is computed
$M$ = number of dielectric layers
$N_o$ = index of refraction of entrance/exit medium
$N_s$ = index of refraction of substrate
$N_j$ = index of refraction of the $j^{th}$ dielectric layer $Q_j$ = thickness of $j^{th}$ dielectric layer expressed in wavelengths of $\lambda_o$
$R(\lambda)$ = Reflectivity at wavelength $\lambda$ We Execute the Following Computation Flow:

$$\delta_j = \frac{\lambda_o}{\lambda} 2\pi Q_j$$

$$\begin{bmatrix} B \\ C \end{bmatrix} = \prod_{j=1}^{M} \begin{bmatrix} \cos\delta_j & \frac{j\sin\delta_j}{N_j} \\ jN_j\sin\delta_j & \cos\delta_j \end{bmatrix} \begin{bmatrix} 1 \\ N_s \end{bmatrix}$$

$$Y = \frac{B}{C}$$

$$R = \left| \frac{N_o - Y}{N_o + Y} \right|^2$$

Where: $\delta_j$ is the computed thickness of layer j expressed in radians at wavelength $\lambda$,
and B, C, Y are dummy variables used to facilitate computational flow.

I claim:
1. An optical device comprising:
a retroreflector corner cube, which corner cube comprises
a) a set of three mutually perpendicular reflecting surfaces; and
b) a face plate located as an entrance window to the set of reflecting surfaces and comprising an enhanced reflectivity coating, such that at least five percent of the energy of a radiation beam incident to the device is reflected at the face plate in accordance with Snell's Law.
2. A device in accordance with claim 1, wherein the face plate comprises transparent glass.
3. A device in accordance with claim 2, wherein the enhanced reflectivity coating comprises zinc sulfide.
4. A device in accordance with claim 3, wherein the coating thickness is 0.05 micron to 5.0 microns.
5. A device in accordance with claim 3, further comprising a secondary coating comprising a magnesium fluoride composition.
6. A device in accordance with claim 1, wherein at least 15% of the energy of a radiation beam incident to the device is reflected at the face plate in accordance with Snell's Law.
7. A device in accordance with claim 6, wherein at least 15% but less than 85% of the energy of a radiation beam incident to the device is reflected at the face plate in accordance with Snell's Law.
8. An optical assembly comprising:
a modified cat's eye retroreflector comprising
a) a mirror; and
b) a lens positioned on a common optical axis with the mirror;
wherein at least one surface of the lens comprises an enhanced reflectivity coating, such that at least five percent of a radiation beam incident to the assembly, is reflected, so that this at least five percent radiation beam exits the retroreflector at an angle equal in magnitude, but opposite in sign to the incident beam, as measured from the common optical axis.

* * * * *